(12) United States Patent
Rahnema et al.

(10) Patent No.: US 7,676,015 B2
(45) Date of Patent: Mar. 9, 2010

(54) BOUNDARY CONDITION ADJUSTMENT METHODS AND SYSTEMS

(75) Inventors: Farzad Rahnema, Roswell, GA (US); Benoit Forget, Temiscaming (CA)

(73) Assignee: Georgia Tech Research Corporation, Atlanta, GA (US)

( * ) Notice: Subject to any disclaimer, the term of this patent is extended or adjusted under 35 U.S.C. 154(b) by 406 days.

(21) Appl. No.: 11/398,956

(22) Filed: Apr. 6, 2006

(65) Prior Publication Data

US 2007/0237282 A1    Oct. 11, 2007

(51) Int. Cl.
    G21C 17/00    (2006.01)
(52) U.S. Cl. .................... 376/245; 376/908; 376/918
(58) Field of Classification Search ............... 376/245, 376/908, 918
    See application file for complete search history.

(56) References Cited

U.S. PATENT DOCUMENTS

| | | | | |
|---|---|---|---|---|
| 3,776,813 | A * | 12/1973 | Corno | 376/257 |
| 5,024,801 | A | 6/1991 | Impink, Jr. et al. | 376/217 |
| 5,171,516 | A | 12/1992 | Iwamoto | |
| 6,795,801 | B1 | 9/2004 | Watkins et al. | |
| 6,801,593 | B2 * | 10/2004 | Chao et al. | 376/254 |
| 6,891,912 | B1 | 5/2005 | Lukic et al. | 376/267 |
| 7,403,585 | B2 * | 7/2008 | Ougouag et al. | 376/381 |
| 2005/0089831 | A1 | 4/2005 | Russell, II et al. | 434/218 |

OTHER PUBLICATIONS

Rahnema, et al., "High-Order Homogenization Method in Diffusion Theory for Reactor Core Simulation and Design Calculation," Final Report, Sep. 30, 2003.*
Lewis, et al.; "Computational Methods of Neutron Transport"; American Nuclear Society, Inc. La Grange Park, Illinois; 1993; pp. 46-47; ISBN: 0-89448-452-4.
Stamm'ler, et al.; "Methods of Steady-State Reactor Physics in Nuclear Design"; Academic Press Ltd., London, Great Britain; 1983; pp. 337-392; ISBN: 0-12-663320-7.
Mosher; "A Variational Transport Theory Method for Two-Dimensional Reactor Core Calculations"; Doctoral Thesis; Georgia Institute of Technology; Jun. 2004; pp. 1-21; http://smartech.gatech.edu/bitstream/1853/5070/1/mosher_scott_w_200407_phd.pdf.
Kelly; "Depletion of a BWR Lattice Using the Racer Continuous Energy Monte Carlo Code"; Proceedings of the International Conference on Mathematics and Computations, Reactor Physics, and Environmental Analysis; American Nuclear Society; Portland, Oregon; Apr. 30-May 4, 1995; vol. 2, p. 1011.
Casal, et al.; "HELIOS: Geometric Capabilites of a New Fuel-Assembly Program"; International Topical Meeting on Advances in Mathematics, Computations, and Reactor Physics; American Nuclear Society; Pittsburgh, Pennsylvania; Apr. 28-May 2, 1991; vol. 2, p. 10.2.1 1-13.
Stamm'ler; Correspondence with F. Rahnema via electronic mail regarding HELOIS code; Oct. 18, 2005.
Briesmeister, J. MCNP™-A General Monte Carlo N-Particle Transport Code, Version 4C, Issued Mar. 2000.
International Search Report and Written Opinion dated Aug. 22, 2007.
Section 3 of BWR/6 General Description of a Boiling Water Reactor (General Electric Company, Nuclear Energy Group, San Jose, CA, 1980, pp. 3-1 through 3-10).
Chapter 10 of Nuclear Reactor Analysis (Dunderstadt et al., John Wiley & Sons, USA, 1976, pp. 398-408).
"TRITON: An Advanced Lattice Code for MOX Fuel Calculations" (DeHart, American Nuclear Society, Advances in Nuclear Fuel Management III, Oct. 2003, pp. 1-16).
"BALO-BWR Assembly Lattice Optimization" (Gu et al., Transactions of the American Nuclear Society, Jun. 2005, vol. 92, pp. 621-623).
Chapter 1 of Computational Methods of Neutron Transport (Lewis et al., American Nuclear Society, Inc., La Grange Park, IL, 1993, pp. 1-57).
J. C. Davis and J. C. Lee, "Comparison of Monte Carlo and Deterministic Depletion Codes for LWR Fuel Cycle" Transactions of the American Nuclear Society, vol. 92, pp. 651-653, Jun. 2005.

* cited by examiner

*Primary Examiner*—Rick Palabrica
(74) *Attorney, Agent, or Firm*—Thomas, Kayden, Horstemeyer & Risley, LLP

(57) ABSTRACT

Methods and systems for reactor lattice depletion are disclosed. One exemplary method, among others, comprises the steps of defining a reactor eigenvalue, the reactor eigenvalue being a specified ratio of actual neutron production to loss in the reactor; producing a lattice eigenvalue, the lattice eigenvalue being an estimated ratio of neutron production to loss in the lattice; and adjusting a boundary condition of the lattice to cause convergence of the lattice eigenvalue and the reactor eigenvalue in order to produce at least one physics parameter.

9 Claims, 3 Drawing Sheets

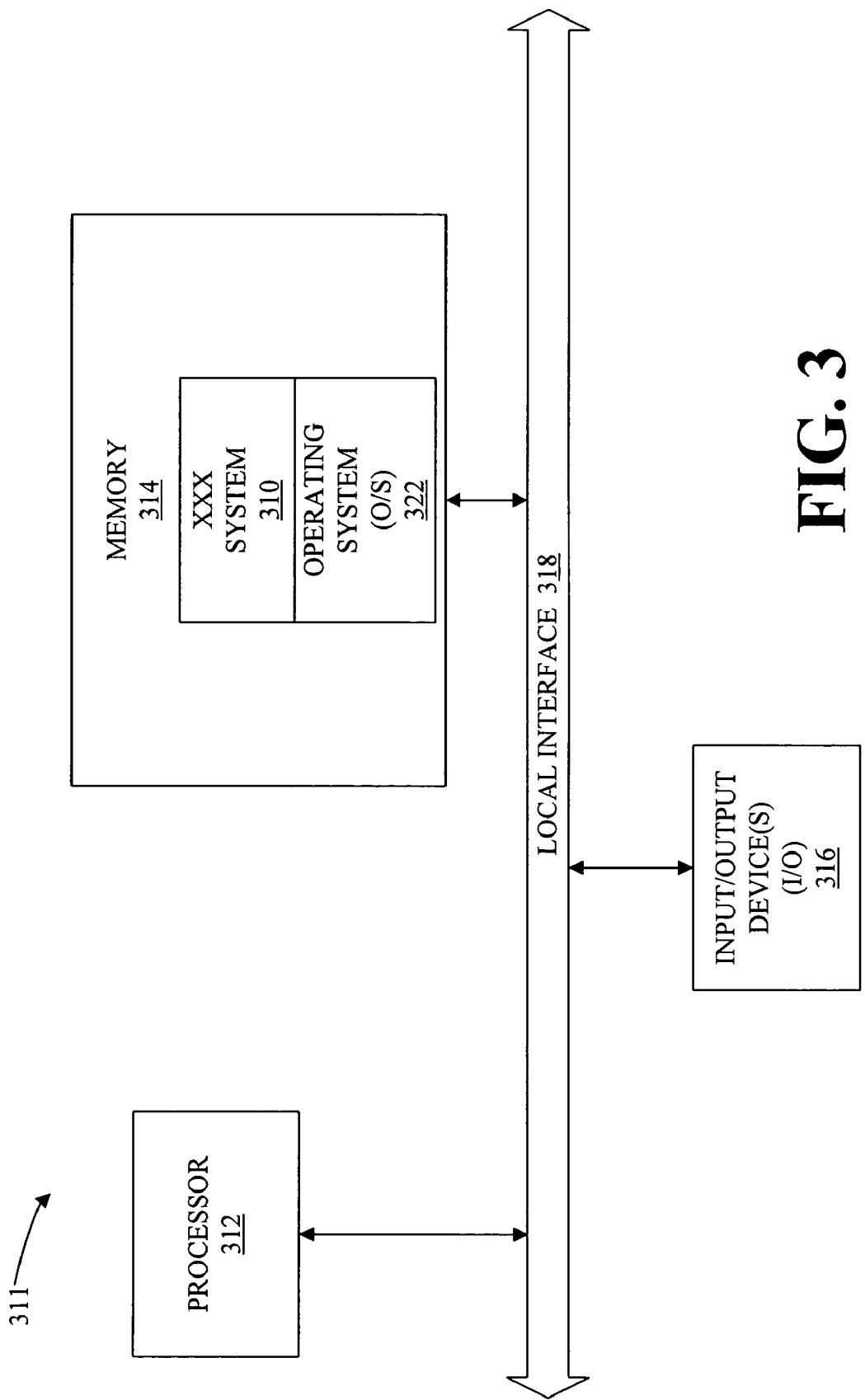

BOUNDARY CONDITION ADJUSTMENT METHODS AND SYSTEMS

TECHNICAL FIELD

The present disclosure is generally related to nuclear reactors and, more particularly, embodiments of the present disclosure are related to methods and systems for reactor lattice depletion.

BACKGROUND

In a typical nuclear reactor, energy is produced from fissionable material located in fuel assemblies or bundles within a reactor core. Depletion of the fissionable material occurs throughout the operational life of a nuclear reactor. Operational and refueling cycles are dependent upon fuel depletion in the reactor core. Reactor core depletion is tracked using lattice depletion estimations.

A lattice represents the spatial distribution of fissionable and non-fissionable materials within a portion of the reactor. Lattice depletion estimations incorporate eigenvalue calculations preformed with defined boundary condition. In an operating reactor, a reactor eigenvalue ($k_{reactor}$) represents the ratio of neutron production to neutron loss (absorption and leakage) within the reactor. Thus, the reactor eigenvalue is one for a self-sustaining reactor, less than one for a subcritical reactor, and greater than one for a supercritical reactor.

Current industry methods assume a fixed reflective boundary condition and solve an auxiliary equation with some simplification (e.g. homogenization) of the lattice to match the operating reactor eigenvalue. However, use of the fixed boundary condition and simplification of the lattice produces a neutron energy spectrum that does not properly account for the actual lattice heterogeneity and boundary effects. Thus, lattice depletion estimations using these methods result in errors in the calculated depletion within the reactor core. These errors can adversely affect fuel utilization, plant availability, operating margins, and fuel damage probabilities.

SUMMARY

Briefly described, embodiments of this disclosure, among others, include methods and systems for reactor lattice depletion. One exemplary method, among others, comprises the steps of defining a reactor eigenvalue, the reactor eigenvalue being a specified ratio of actual neutron production to loss in the reactor; producing a lattice eigenvalue, the lattice eigenvalue being an estimated ratio of neutron production to loss in the lattice; and adjusting a boundary condition of the lattice to cause convergence of the lattice eigenvalue and the reactor eigenvalue in order to produce at least one physics parameter.

Systems are also provided. One exemplary system, among others, comprises means for defining a reactor eigenvalue, the reactor eigenvalue being a specified ratio of actual neutron production to loss in the reactor; means for producing a lattice eigenvalue, the lattice eigenvalue being an estimated ratio of neutron production to loss in the lattice; and means for adjusting a boundary condition of the lattice to cause convergence of the lattice eigenvalue and the reactor eigenvalue in order to produce at least one physics parameter.

Another exemplary embodiment, among others, comprises a computer readable medium having software code configured to perform the steps of defining a reactor eigenvalue, the reactor eigenvalue being a specified ratio of actual neutron production to loss in the reactor; producing a lattice eigenvalue, the lattice eigenvalue being an estimated ratio of neutron production to loss in the lattice; and adjusting a boundary condition of the lattice to cause convergence of the lattice eigenvalue and the reactor eigenvalue in order to produce at least one physics parameter.

Other structures, systems, methods, features, and advantages will be, or become, apparent to one with skill in the art upon examination of the following drawings and detailed description. It is intended that all such additional structures, systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is an example of a general purpose computer that can implement the boundary condition adjustment method of FIGS. 1 and 2.

DETAILED DESCRIPTION

Figure 1:
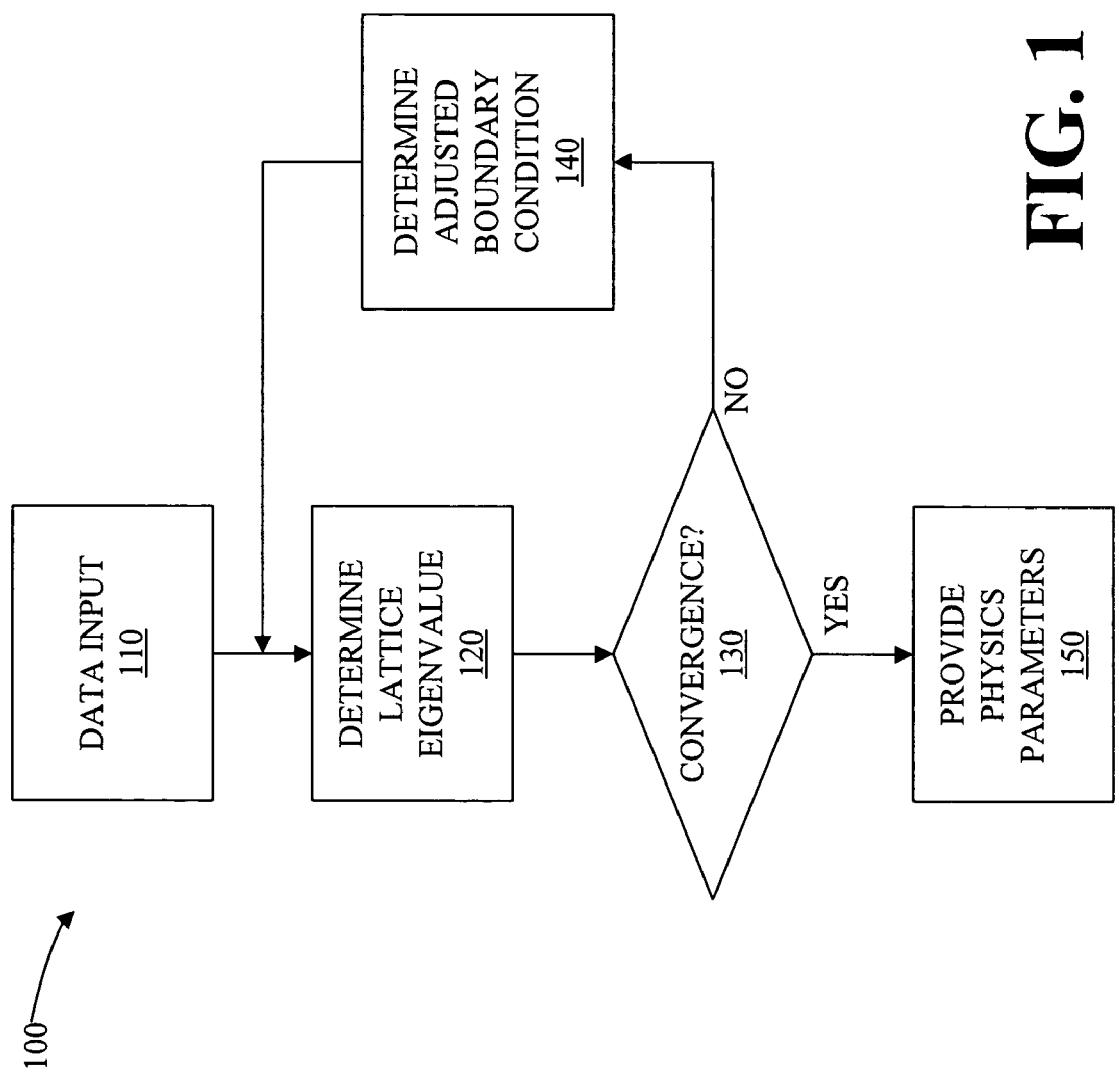
FIG. 1 illustrates a boundary condition adjustment method in accordance with the present invention.

Reactor lattice depletion methods solve transport theory to determine the neutron distributions within a lattice. The Boltzmann neutron transport equation, $$[\hat{\Omega}\cdot\vec{\Delta}+\sigma(\vec{r},E)]\phi(\vec{r},\hat{\Omega},E)= \quad \text{(Equation 1)}$$
$$\int dE' \int d\Omega' \sigma_s(\vec{r},\Omega'\rightarrow\Omega,E'\rightarrow E)\phi(\vec{r},\hat{\Omega}',E')+$$
$$\frac{\chi(E)}{k}\int dE' \nu\sigma_f(\vec{r},E')\int d\Omega' \phi(\vec{r},\hat{\Omega}',E'),$$

provides a description of the distribution of neutrons in space, energy and direction (of motion) and is required for depletion estimation. Lattice depletion methods apply neutron transport theory to relatively small portions of the reactor defined by a lattice with defined boundary conditions. A lattice typically represents the spatial distribution of fissionable and non-fissionable materials in a section of the reactor. Each lattice is defined by the user and is dependent upon the reactor design. Predefined lattices are available from manufactures for commercially available fuel assemblies or bundles. Lattices can also be individually generated for new designs.

A lattice eigenvalue ($k_{lattice}$) represents the ratio of neutron production to neutron loss within the lattice. Current industry methods solve the neutron transport eigenvalue equation using a reflective boundary condition. Reflective boundary conditions equate the lattice transport problem to one involving an infinitely large core composed of a single type of assembly or bundle. The reflective condition represents the assumption that all neutrons that reach the boundary of the lattice are either reflected back into the lattice or replaced by incoming neutrons, i.e. no leakage. The largest positive eigenvalue for a lattice with reflective boundary conditions represents the infinite medium neutron multiplication factor ($k_\infty$), the ratio of neutron production to neutron absorption, since the boundary condition does not allow for any neutron leakage.

In an operating reactor, a reactor eigenvalue ($k_{reactor}$) represents the actual neutron production to loss ratio within the reactor. Since the lattice boundary condition is not known a priori, current industry methods match the lattice eigenvalue to the reactor eigenvalue by simplifying or spatially homogenizing the lattice and then iteratively adjusting the leakage though the buckling term in the transport equation. The resulting neutron energy spectrum from these calculations does not properly account for the lattice heterogeneity and the boundary conditions in the operating reactor. As a result, subsequent lattice depletion estimations may not be accurate. To obtain improved results, the lattice boundary condition must simulate the environment within the nuclear reactor core.

Embodiments of a boundary condition adjustment method and system are described below. It should be emphasized that the described embodiments are merely possible examples of implementations, and are set forth for clear understanding of the principles of the present disclosure, and in no way limit the scope of the disclosure.

FIG. 1 illustrates a boundary condition adjustment (BCA) method. The boundary condition adjustment method adjusts the boundary conditions causing the lattice eigenvalue to converge to the reactor eigenvalue, while maintaining the heterogeneity of the lattice. The boundary condition adjustment method 100 receives input data from a user (110). Input data can include, but are not limited to, the reactor eigenvalue, initial boundary conditions, and a specified lattice. For source driven reactors, the reactor eigenvalue is replaced with a multiplicity constant (k). Boundary conditions can be defined as, but are not limited to, constants, spatially dependent functions, and functions in terms of reflection coefficients.

Determination of a lattice eigenvalue (120) is carried out utilizing the input data. This determination can be accomplished using either deterministic or stochastic methods to solve the neutron transport problem. Deterministic methods include, but are not limited to, collision probability method (CPM), method of characteristics (MOC), discrete-ordinate methods, even-parity methods, response matrix methods, and finite element methods. Stochastic methods include, but are not limited to, Monte Carlo methods (either continuous energy or multigroup), Markov methods, and Stochastic Mesh methods. Convergence of the lattice eigenvalue to the reactor eigenvalue is then evaluated (130).

If the lattice eigenvalue has not converged, then the initial boundary condition is adjusted to determine an adjusted boundary condition (140). The adjusted boundary condition is then used to adjust the lattice eigenvalue by repeating the lattice eigenvalue determination (120). Evaluation of the convergence (130) of the adjusted lattice eigenvalue to the reactor eigenvalue is performed. This sequence of determining the adjusted boundary condition (140), adjusting the lattice eigenvalue (120), and evaluating convergence (130) is continued until convergence of the lattice eigenvalue to the reactor eigenvalue is achieved to within a preset limit.

When the lattice eigenvalue converges, the solution including all ensuing parameters or quantities resulting from the solution itself, such as, but not limited to, physics parameters, are provided (150) for use in reactor design, optimization, simulation and monitoring. Physics parameters can include, but are not limited to, neutron flux and current, neutron absorption, neutron fission, neutron scattering kernel, fission spectrum, neutron spectrum, and the adjusted boundary condition. Because adjustments are performed directly on the boundary condition without any simplification of the geometry or the material distribution in the lattice, estimates of spatial and spectral distributions of the neutrons are improved. It is possible to perform critical ($k_{reactor}=1$) as well as fixed multiplicity constant (user defined k) lattice depletion estimations using the BCA method 100.

Figure 2:
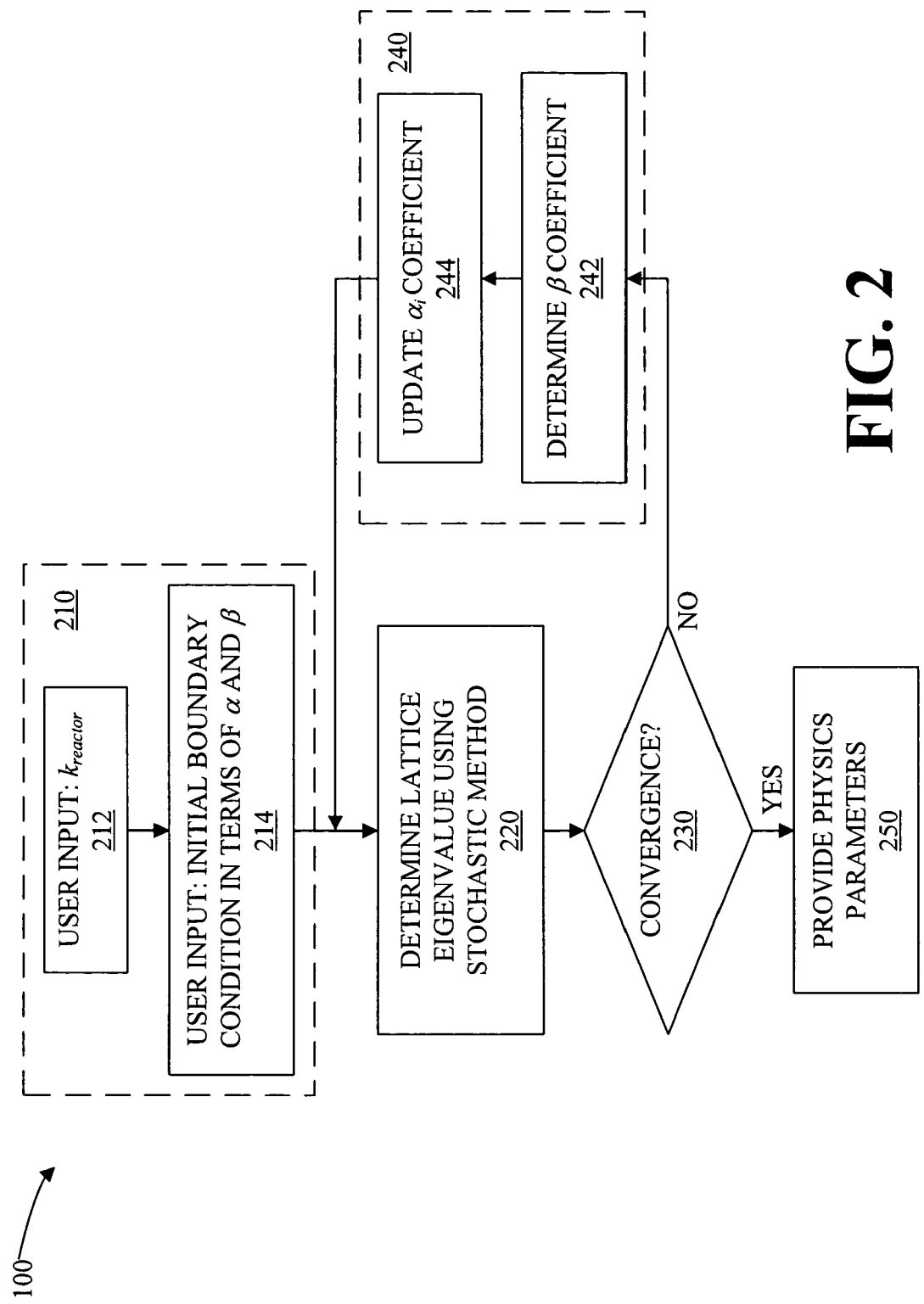
FIG. 2 is an alternative embodiment of the boundary condition adjustment method of FIG. 1 utilizing a stochastic method in the lattice eigenvalue determination.

FIG. 2 is an alternative embodiment of the boundary condition adjustment (BCA) method utilizing a stochastic method in the lattice eigenvalue determination. In this non-limiting embodiment of the BCA method 100, input data provided by the user (210) includes, but is not limited to, a reactor eigenvalue 212 and an initial boundary condition 214. The initial boundary condition is defined in terms of reflection coefficients. In this non-limiting embodiment, the reflection coefficients are designated $\alpha$ and $\beta$.

The $\alpha$ coefficient is defined such that for each neutron that reaches an external boundary an $\alpha$-fraction of this neutron will leak out of or into the lattice and $(1-\alpha)$ fraction will respectively be reflected back into or out of the lattice with a user defined distribution, such as, but not limited to, specular reflection, mirror reflection, white reflection, and isotropic reflection. The sign of $\alpha$ determines the leakage direction— out of (positive) or into (negative) the lattice. The $\alpha$ coefficient can be constant or spatially vary based on segment or point on the lattice boundary. The $\alpha$ coefficient is a function of the $\beta$ coefficient. The function can be the same for all $\alpha$ coefficients or can spatially vary with each boundary segment. A reflective boundary condition is described when the values of $\alpha$ and $\beta$ coefficients are zero. The initial choice of $\alpha$ and $\beta$ is entirely up to the user. If one has prior knowledge of the problem, these variables can be adjusted to minimize convergence iterations.

Determination of the lattice eigenvalue (220) can begin once the boundary conditions are defined for the lattice. In this non-limiting embodiment, the lattice has been specified prior to the data input (210) being completed. The lattice eigenvalue is produced by solving the neutron transport problem stochastically using a Monte Carlo method. Deterministic methods may also be utilized to determine the lattice eigenvalue. Such stochastic and deterministic methods are well known to those skilled in the art.

Convergence of the lattice eigenvalue ($k_{lattice}$) to the reactor eigenvalue ($k_{reactor}$) is then checked (230). Convergence occurs when the lattice eigenvalue approaches to within a preset limit of the reactor eigenvalue. Appropriate choice of the preset limit can minimize convergence iterations. In this non-limiting embodiment, the lattice eigenvalue is directly compared to the reactor eigenvalue. Convergence can also be evaluated using other variables, such as, but not limited to, the refection coefficients $\alpha$ and $\beta$ since these converge simultaneously with the lattice eigenvalue.

If the lattice eigenvalue has not converged, then the initial boundary condition is adjusted to determine an adjusted boundary condition (240). In this non-limiting embodiment, the $\beta$ coefficient is adjusted (242) using the following equation.

$$\beta_{u+1} = C_{1,u}(k_{lattice,u} - k_{reactor}) + C_{2,u}\beta_u \quad \text{(Equation 2)}$$

In this equation, $C_1$ and $C_2$ are arbitrary variables and an index u indicates the iteration or cycle number (e.g., source iteration). The values of $C_1$ and $C_2$ can be determined based on the physics of the current problem or randomly chosen from within a user defined range. This user defined range can be based on the relevant physics of the problem at hand. Values of $C_1$ and $C_2$ that are too high will result in strong oscillations in the lattice eigenvalue hindering its convergence. Values that are too small will result in slow convergence to the reactor eigenvalue.

Once the β coefficient is adjusted, the α coefficient is then updated (244) using the following equation.

$$\alpha_{i,u+1}{}^p = f_i{}^p(\beta_{u+1}), \forall i \in \partial V \quad \text{(Equation 3)}$$

In this equation, an index i refers to a boundary segment or point on the surface ∂V, p represents remaining phase space variables, and $f$ is the function describing the relationship between the α and β coefficients. Equation 3 allows the α coefficient values to vary for different segments or points on the boundary and the remaining phase space. The function $f$ can also vary for different segments or points on the boundary and the remaining phase space. In a non-limiting embodiment where all α coefficient values are the same and are equal to the β coefficient, then β can be directly replaced in Equation 2.

$$\alpha_{u+1} = \beta_{u+1} = C_{1,u}(k_{lattice,u} - k_{reactor}) + C_{2,u}\beta_u = C_{1,u}(k_{lattice,u} - k_{reactor}) + C_{2,u}\alpha_u \quad \text{(Equation 4)}$$

The adjusted boundary condition is then used to adjust the lattice eigenvalue by repeating the lattice eigenvalue determination (220). This sequence of evaluating convergence (230), determining the adjusted boundary condition (240), and adjusting the lattice eigenvalue (220) is continued until convergence of the lattice eigenvalue to within the preset limit of the reactor eigenvalue is achieved. The variables $C_1$ and $C_2$ can be estimated based on the physics of the neutron transport problem at hand. In this non-limiting example, the estimation of $C_1$ and $C_2$ is based on the neutron balance. The lattice eigenvalue can be calculated as the ratio of neutron production to neutron loss given by the following equation.

$$k_{lattice,u} = \frac{\int_S F\phi_u ds}{\int_S H\phi_u ds + L_u} \quad \text{(Equation 5)}$$

In this equation, $\phi_u$ is the lattice neutron flux distribution as a function of the phase space s, the numerator represents total production (integrated over the entire phase space s) in the lattice, the first term in the denominator represents total absorption (integrated over the entire phase space s) in the lattice, and $L_u$ is net neutron leakage from the lattice. The net neutron leakage is zero for a fully reflective boundary condition.

The reactor eigenvalue can be represented using the same relationship in terms of reactor neutron flux distribution ($\phi_{reactor}$) and reactor neutron leakage ($L_{reactor}$).

$$k_{reactor} = \frac{\int_S F\phi_{reactor} ds}{\int_S H\phi_{reactor} ds + L_{reactor}} \quad \text{(Equation 6)}$$

Since the reactor flux distribution ($\phi_{reactor}$) is not known a priori, it is approximated using lattice neutron flux distribution ($\phi_u$). This allows an approximation of the lattice neutron leakage ($L_{u+1}$) for use in an iteration process as follows where u indicates the iteration or cycle number.

$$L_{u+1} = \frac{(k_{lattice,u} - k_{reactor})\int_S H\phi_u ds}{k_{reactor}} + \frac{k_{lattice,u}}{k_{reactor}}L_u \quad \text{(Equation 7)}$$

This lattice neutron leakage term can be used to estimate $C_1$ and $C_2$. Using different approximations will yield different expressions for the $C_1$ and $C_2$ variables.

In the non-limiting embodiment where all α coefficient values are the same and equal to the β coefficient, as shown in Equation 4, the α coefficient can be estimated using the ratio of the lattice neutron leakage term ($L_{u+1}$) to the term accounting for the neutrons reaching the lattice surface ($J_u$). Substituting for the neutron leakage term, allows Equation 7 to be rewritten as follows.

$$\alpha_{u+1} = \frac{(k_{lattice,u} - k_{reactor})\int_S H\phi_u ds}{J_u \cdot k_{reactor}} + \frac{k_{lattice,u}}{k_{reactor}} \frac{J_{u-1}\alpha_u}{J_u} \quad \text{(Equation 8)}$$
$$= C_{1,u}(k_{lattice,u} - k_{reactor}) + C_{2,u}\alpha_u$$

This iterative process is then used to provide an adjusted boundary condition. As can be seen from Equation 8, the leakage term and α coefficient converge as the lattice eigenvalue converges to the reactor eigenvalue. This process can be utilized in either deterministic or stochastic methods.

Since one must compute the total absorption term and $J_u$ on all boundaries, implementation of this method can be complicated. Further simplifications in deterministic or stochastic codes, such as, but not limited to, Monte Carlo N-Particle transport code (MCNP), can improve solution times. In a non-limiting implementation using MCNP code, an average lattice eigenvalue ($k_{ave}$) is estimated by a stochastic process. Since MCNP code normalizes the solution in such a way that the production term in the numerator of Equation 5 is equal to the average lattice eigenvalue, the integrated absorption term in the denominator of Equation 5 can be approximated by ($1-L_u$). This normalization also allows approximating $J_u$ by $k_{ave}$. Equation 8 can be rewritten as the following since $C_{2,u}$ converges to unity (one) as the eigenvalues and leakage converge.

$$\alpha_{u+1} = \frac{(k_{ave} - k_{reactor})(1 - L_u)}{k_{ave}k_{reactor}} + \alpha_u = C_{1,u}(k_{ave} - k_{reactor}) + \alpha \quad \text{(Equation 9)}$$

Application of this model does not take into account the random nature of the stochastic process. This introduces a bias in the eigenvalue calculations that can cause strong oscillations. Introducing a random factor (ρ) to Equation 9 can be used to control the attributed contribution to the leakage such that Equation 9 becomes the following.

$$\alpha_{u+1} = \rho\frac{(k_{ave} - k_{reactor})(1 - L_u)}{k_{reactor}k_{ave}} + \alpha_u \quad \text{(Equation 10)}$$

Introduction of the random factor (ρ) mitigates, but does not eliminate oscillations in the eigenvalue calculations. Trends can still persist because the α coefficient depends only on $k_{ave}$ and does not take into account the eigenvalue of the previous cycle. This can be incorporated by replacing $k_{ave}$ with a weighted sum of $k_{ave}$ and the previous lattice eigenvalue ($k_u$).

$$k_{new} = w_{avg}k_{ave} + w_u k_u \quad \text{(Equation 11)}$$

In this equation, the weights attributed to each respective eigenvalue ($w_{ave}$ and $w_u$) are normalized to sum equal to one. A simple averaging of $w_{ave} = w_u = 0.5$ can greatly improve the trend of the eigenvalue.

Incorporating the random factor ($\rho$) and weighted sum ($k_{new}$) in this non-limiting implementation, the $C_{1,u}$ variable can be expressed as the following.

$$C_{u,1} = \rho \frac{(1 - L_u)}{k_{reactor} k_{new}} \quad \text{(Equation 12)}$$

Using different approximations can yield different expressions for the $C_{1,u}$ variable.

When the lattice eigenvalue has converged within a preset limit to the reactor eigenvalue, user selected physics parameters determined from the adjusted boundary condition are provided (250). If the lattice eigenvalue converged using the initial boundary condition, then adjustment of the boundary condition is not necessary and user selected physics parameters produced using the initial boundary condition are provided to the user.

The boundary condition adjustment (BCA) system of the invention can be implemented in software (e.g., firmware), hardware, or a combination thereof. In the currently contemplated best mode, the BCA system is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement the BCA system of the present invention is shown in FIG. 3. In FIG. 3, the BCA system is denoted by reference numeral 310.

Generally, in terms of hardware architecture, as shown in FIG. 3, the computer 311 includes a processor 312, memory 314, and one or more input and/or output (I/O) devices 316 (or peripherals) that are communicatively coupled via a local interface 318. The local interface 318 can be, for example but not limited to, one or more buses or other wired or wireless connections, as is known in the art. The local interface 318 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 312 is a hardware device for executing software, particularly that stored in memory 314. The processor 312 can be any custom made or commercially available processor, a central processing unit (CPU), an auxiliary processor among several processors associated with the computer 311, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 314 can include any one or combination of volatile memory elements (e.g., random access memory (RAM, such as DRAM, SRAM, SDRAM, etc.) and nonvolatile memory elements (e.g., ROM, hard drive, tape, CDROM, etc.). Moreover, the memory 314 may incorporate electronic, magnetic, optical, and/or other types of storage media. Note that the memory 314 can have a distributed architecture, where various components are situated remote from one another, but can be accessed by the processor 312.

The software in memory 314 may include one or more separate programs, each of which comprises an ordered listing of executable instructions for implementing logical functions. In the example of FIG. 3, the software in the memory 314 includes the BCA system in accordance with the present invention and a suitable operating system (O/S) 322. A non-exhaustive list of examples of suitable commercially available operating systems 322 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 322 essentially controls the execution of other computer programs, such as the BCA system 310, and provides scheduling, input-output control, file and data management, memory management, and communication control and related services.

The BCA system 310 is a source program, executable program (object code), script, or any other entity comprising a set of instructions to be performed. When a source program, then the program needs to be translated via a compiler, assembler, interpreter, or the like, which may or may not be included within the memory 314, so as to operate properly in connection with the O/S 322. Furthermore, the BCA system 310 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In the currently contemplated best mode of practicing the invention, the BCA system 310 can be implemented using Monte Carlo N-Particle transport code (MCNP).

The I/O devices 316 may include input devices, for example but not limited to, a keyboard, mouse, scanner, microphone, etc. Furthermore, the I/O devices 316 may also include output devices, for example but not limited to, a printer, display, etc. Finally, the I/O devices 316 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 311 is a PC, workstation, or the like, the software in the memory 314 may further include a basic input output system (BIOS) (omitted for simplicity). The BIOS is a set of essential software routines that initialize and test hardware at startup, start the O/S 322, and support the transfer of data among the hardware devices. The BIOS is stored in ROM so that the BIOS can be executed when the computer 311 is activated.

When the computer 311 is in operation, the processor 312 is configured to execute software stored within the memory 314, to communicate data to and from the memory 314, and to generally control operations of the computer 311 pursuant to the software. The BCA system 310 and the O/S 322, in whole or in part, but typically the latter, are read by the processor 312, perhaps buffered within the processor 312, and then executed.

When the BCA system 310 is implemented in software, as is shown in FIG. 3, it should be noted that the BCA system 310 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The BCA system 310 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the BCAS system 310 is implemented in hardware, the BCA system can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, at least the following is claimed:

1. A method for determining a spatial and energy distribution of neutrons in a nuclear reactor lattice depletion, the method, when implemented by a computer, comprising the steps of:
    obtaining a reactor eigenvalue, the reactor eigenvalue being a specified ratio of actual neutron production to loss in a nuclear reactor;
    determining a lattice eigenvalue based upon reflective boundary conditions ($\alpha$) of a lattice representing at least a portion of the nuclear reactor, the lattice eigenvalue being an estimated ratio of neutron production to loss in the lattice, the lattice including a lattice boundary comprising a plurality of boundary segments, the lattice boundary associated with the reflective boundary conditions along the plurality of boundary segments;
    adjusting at least one of the reflective boundary conditions ($\alpha$) of the lattice to cause convergence of the lattice eigenvalue and the reactor eigenvalue, while maintaining the heterogeneity of the lattice;
    repeating the determining and adjusting steps, without homogenization of the lattice, until the lattice eigenvalue is within a preset limit of the reactor eigenvalue; and
    responsive to the lattice eigenvalue being within the preset limit of the reactor eigenvalue, providing the adjusted reflective boundary conditions for determination of the spatial and spectral distribution of neutrons.

2. The method in claim 1, wherein the lattice eigenvalue is initially determined based upon user defined reflective boundary conditions.

3. The method in claim 2, wherein the user defined reflective boundary conditions vary along the plurality of boundary segments.

4. The method in claim 1, wherein the lattice eigenvalue is produced using a stochastic method.

5. The method in claim 4, wherein the stochastic method is a Monte Carlo method.

6. The method in claim 1, wherein the lattice eigenvalue is produced using a deterministic method.

7. The method in claim 1, wherein the at least one of the reflective boundary conditions is adjusted based upon a difference between the reactor eigenvalue and the lattice eigenvalue.

8. The method in claim 7, wherein adjustment of the at least one of the reflective boundary conditions varies along the plurality of boundary segments.

9. The method in claim 1, wherein the reflective boundary conditions are defined in terms of at least one reflection coefficient.

* * * * *

UNITED STATES PATENT AND TRADEMARK OFFICE
CERTIFICATE OF CORRECTION

| | | |
|---|---|---|
| PATENT NO. | : 7,676,015 B2 | Page 1 of 1 |
| APPLICATION NO. | : 11/398956 | |
| DATED | : March 9, 2010 | |
| INVENTOR(S) | : Farzad Rahnema and Benoit Forget | |

It is certified that error appears in the above-identified patent and that said Letters Patent is hereby corrected as shown below:

In FIG. 3, element 310, delete "XXX SYSTEM" and replace with --BCA SYSTEM--.

At column 1, line 23, delete "performed with defined boundary condition" and replace with --performed with a defined boundary condition--.

At column 5, line 4, delete "the a coeffient is" and replace with --the $\alpha$ coeffient is--.

At column 9, line 48, delete "In the alternative embodiment, where the BCAS system 310" and replace with --In the alternative embodiment, where the BCA system 310--.

Signed and Sealed this

Twentieth Day of July, 2010

David J. Kappos
*Director of the United States Patent and Trademark Office*